United States Patent [19]

Yoshie et al.

[11] Patent Number: 5,006,979
[45] Date of Patent: Apr. 9, 1991

[54] PHASE SYNCHRONIZATION SYSTEM

[75] Inventors: Tatsuo Yoshie; Mitsuharu Nagai, both of Tokyo, Japan

[73] Assignee: Hitachi, Ltd., Tokyo, Japan

[21] Appl. No.: 888,409

[22] Filed: Jul. 23, 1986

[30] Foreign Application Priority Data

Jul. 29, 1985 [JP] Japan .................................. 60-167199

[51] Int. Cl.⁵ ............................................... G06F 1/12
[52] U.S. Cl. .................................. 364/200; 364/270.0; 364/271.2; 364/271.5
[58] Field of Search ... 364/200 MS File, 900 MS File

[56] References Cited

U.S. PATENT DOCUMENTS

| | | | |
|---|---|---|---|
| 3,435,424 | 3/1969 | Schira et al. | 364/200 |
| 3,602,900 | 8/1971 | Delaigue | 364/200 |
| 3,761,889 | 9/1973 | Avsan et al. | 364/200 |
| 4,021,784 | 5/1977 | Kimlinger | 364/200 |
| 4,099,241 | 7/1978 | Ossfeldt | 364/200 |
| 4,386,401 | 5/1983 | O'Brien | 364/200 |
| 4,393,501 | 7/1983 | Kellogg et al. | 364/200 |
| 4,414,676 | 11/1983 | Kraul et al. | 375/116 |
| 4,419,739 | 12/1983 | Blum | 364/900 |
| 4,428,044 | 1/1984 | Liron | 364/200 |
| 4,503,490 | 3/1985 | Thompson | 364/200 |
| 4,545,030 | 10/1985 | Kitchin | 364/900 |
| 4,551,836 | 11/1985 | Parikh | 371/1 |
| 4,592,051 | 5/1986 | Frizlen | 370/113 |
| 4,606,022 | 8/1986 | Suzuki et al. | 370/85 |
| 4,674,036 | 6/1987 | Conforti | 364/200 |
| 4,763,297 | 8/1988 | Uhlenhoff | 364/900 |

FOREIGN PATENT DOCUMENTS

| 1440510 | 6/1976 | United Kingdom | 364/200 |
|---|---|---|---|
| 1444067 | 7/1976 | United Kingdom | 364/200 |

Primary Examiner—Gareth D. Shaw
Assistant Examiner—Maria Napiorkowski
Attorney, Agent, or Firm—Antonelli, Terry, Stout & Kraus

[57] ABSTRACT

Basic operation clock generators for effecting frequency division of the system clock are provided for respective ones of a plurality of processors, and the basic operation clock generators associated with respective processors are connected in cascade. The basic operation clock generator of the preceding stage produces a synchronization signal in response to each particular state of the basic operation clock signal and supplies the synchronization signal to a basic operation clock generator of a succeeding stage, and the basic operation clock generator of the succeeding stage establishes the initial state in the basic operation clock signal by using the synchronization signal supplied from the basic operation clock generator as a control signal, whereby the phases of basic operation clock signals of respective processors are matched to each other.

9 Claims, 4 Drawing Sheets

PHASE SYNCHRONIZATION SYSTEM

BACKGROUND OF THE INVENTION

The present invention relates to a phase synchronization system for aligning the phases of basic operation clock signals of central processors in a system including a plurality of central processors activated by those basic operation clock signals.

In a conventional system such as a multiprocessor system, basic operation clock signals for activating respective central processors are generally produced by a basic operation clock generator disposed in common to respective central processors and supplied to respective central processors to synchronize the operation of central processors with each other. FIG. 4 shows an example of a configuration of a clock signal supply circuit. On the basis of a system clock supplied from an oscillator 1, a basic operation clock generator 20 produces basic operation clock signals for activating respective central processors 30 and supplies them to respective central processors 30.

Such a configuration is adopted to reduce the size of the basic operation clock generator which is a common part. With the progress of the integrated circuit technology, however, the factors defining the physical dimensions tend to heavily depend on not only the logic size but also the number of input and output terminals. Since the basic operation clock signals must be distributed to respective central processors in the configuration exemplified in FIG. 4, therefore, the number of output terminals of the basic operation clock generator is defined by the number of central processors 30 supplied with the basic operation clock signals. The limit in physical size reduction of the basic operation clock generator 20 is thus defined. As a result, the size reduction of the system is hampered and its cost might be increased.

In one countermeasure to such drawbacks, basic operation clock generators are disposed for each central processor as shown in FIG. 5, for example. In a central processing unit 2 of FIG. 5, for example, a basic operation clock generator 21 produces a basic operation clock signal for a central processor 22 on the basis of the system clock signal supplied from an oscillator 1 and supplies the basic operation clock signal to the central processor 22. Similar operation is conducted in other central processing units.

In the configuration as shown in FIG. 5, the basic operation clock generator needs to supply the basic operation clock signal only to the central processor within its own central processing unit, optimization in the central processing unit being enabled. Further, the reduction in the number of input and output terminals of the basic operation clock generator facilitates the size reduction of the system and the use of VLSI's in the system. In addition, this configuration is advantageously employed when a multiprocessor system is to be arranged by building up a plurality of single processors each including one central processing unit or by increasing the number of single multiprocessor systems. It is thus possible to obtain a wide variety of computer line ups by using an identical hardware configuration.

When the configuration as shown in FIG. 5 is employed, however, phase synchronization between the basic operation clock signals for attaining synchronization between the central processors poses a problem.

A method for aligning phases of basic operation clock signals of a plurality of apparatuses included in a system and activated by those basic operation clock signals having identical repetition periods as shown in FIG. 5 is described in Japanese Patent Unexamined Publication No. 123911/84, for example.

In accordance with this technique, microprocessors respectively placed with respect to two apparatuses divide the frequency of clock signal supplied from a clock source and supply bus clock signals to the associated apparatuses. In order to synchronize bus clock signals supplied to respective apparatuses, both clock signals are supplied to an AND circuit. As long as a timing error signal is sent out from the AND circuit, one of the microprocessors is not supplied with clock signals so that one of the microprocessors may not apply frequency division to clock signals supplied from the clock source. Thereby, the bus clock signal of one of the microprocessors is delayed and the mutual phase relations are successively shifted. Finally, the phases of both bus clock signals are aligned with each other. When this method is used, however, the phase difference of bus clock signals between apparatuses must be detected. Therefore, the configuration of the AND circuit varies according to the number of apparatuses forming the system. And, the AND circuit tends to become complicated as the number of apparatuses is increased. Further, synchronization tends to be time-consuming when the bus clock signals are generated at low speed or sporadically, because the phase relations are successively shifted to attain synchronization.

SUMMARY OF THE INVENTION

An object of the present invention is to provide means for rapidly synchronizing a plurality of apparatuses included in a system and activated by basic operation clocks, irrespective of the number of apparatuses included in the system.

In accordance with the present invention, basic operation clock generators are disposed for respective apparatuses, and basic operation clock generators of respective apparatuses are connected in cascade. The basic operation clock generator of the preceding stage produces a synchronization signal in response to each particular state of the basic operation clock signal and supplies the synchronization signal to a basic operation clock generator of a succeeding stage, and the basic operation clock generator of a succeeding stage establishes the initial state in the basic operation clock signal by using the synchronization signal supplied from the basic operation clock generator as a control signal, whereby the phases of the basic operation clock signals of respective apparatuses are matched to each other.

DESCRIPTION OF THE PREFERRED EMBODIMENTS

An embodiment of the present invention will now be described by referring to FIGS. 1 to 3.

Figure 1:
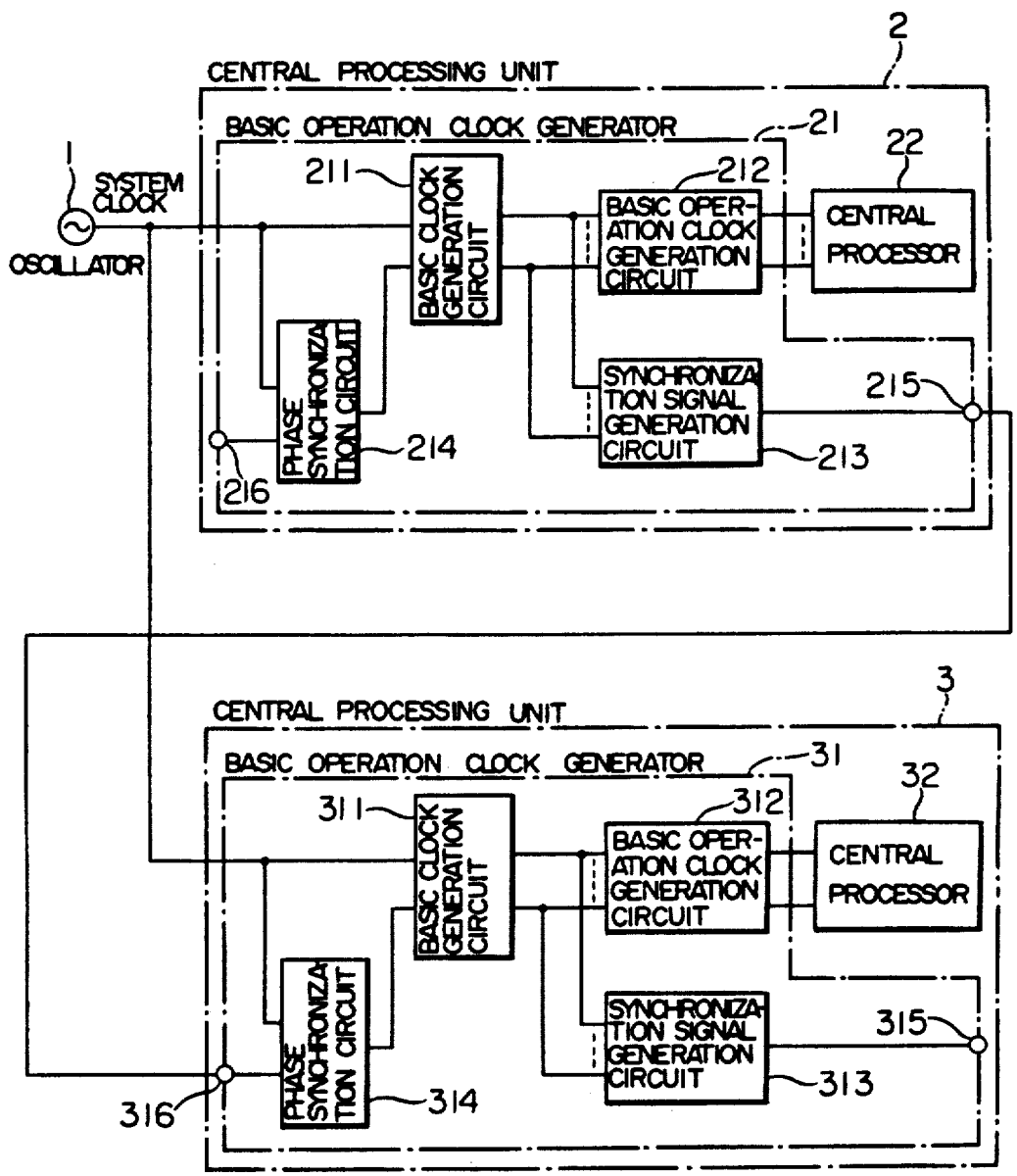
FIG. 1 is a block diagram of an embodiment of the present invention.

FIG. 1 is a block diagram of an embodiment of the present invention. In FIG. 1, the present invention is applied to a system including two central processing units.

A central processing unit 2 is composed of a basic operation clock generator 21 and a central processor 22. The basic operation clock generator 21 is composed of a basic clock generation circuit 211 for generating a basic clock signal used in the basic operation clock generator 21 on the basis of the system clock signal of the oscillator 1, a basic operation clock generation circuit 212 for generating a basic operation clock signal on the basis of the basic clock signal, a synchronization signal generation circuit 213 which generates a synchronization signal for synchronizing another basic operation clock generator, a synchronization signal output terminal 215 for sending out the synchronization signal, a phase synchronization circuit 214 for establishing a particular state in the basic clock generation circuit 211 on the basis of a control signal described later, and a control signal input terminal 216 for receiving the control signal. In the same way, a central processing unit 3 is composed of a basic operation clock generator 31 and a central processor 32. The basic operation clock generator 31 is composed of a basic clock generation circuit 311, a basic operation clock generation circuit 312, a synchronization signal generation circuit 313, a synchronization signal output terminal 315, a phase synchronization circuit 314, and a control signal input terminal 316. Each of these processing units 2 and 3 may consist of one VLSI or may consist of discrete parts.

In a case shown in FIG. 1, the basic operation clock generator 21 of the central processing unit 2 serves as the master side for effecting phase synchronization between basic operation clock signals. The basic operation clock generator 31 of the central processing unit 3 serves as the slave side. That is to say, the synchronization signal output terminal 215 of the basic operation clock generator 21 located at the master side is connected to the control signal input terminal 316 of the basic operation clock generator 31 located at the slave side. Thus, the synchronization signal produced by the synchronization signal generation circuit 213 on the basis of the timing signal supplied from the basic clock generation circuit 211 of the master side is received as the control signal by the phase synchronization circuit 314 of the slave side to establish a predetermined state in the basic clock generation circuit 311. When the state of the basic clock generation circuit 311 located at the slave side matches that of the basic clock generation circuit 211 by this operation, phase synchronization between the master and slave sides is attained. Until the output signal of the basic clock generation circuit 211 located at the master side is supplied to the basic clock generation circuit 311 of the slave side as the state establishing signal, it passes through wiring patterns connecting the synchronization signal generating circuit 213, phase synchronization circuit 314, synchronization signal output terminal 215 and the control signal input terminal 316. The sum of delay times of these elements can be obtained at the time of designing respective elements. The delay time of the signal due to these elements can be predicted in advance at the time of designing the circuitry. The synchronization signal generated by the synchronization signal generating circuit 213 is set to have a value which corrects the amount of this delay. Also, in the phase synchronization circuit 314, by synchronizing (temporary holding of data) the synchronization signal supplied thereto with a system clock, it is possible to provide an initializing signal for one cycle of the system clock to the basic synchronization circuit 311 which performs counting operation by the same system clock.

Figure 2:
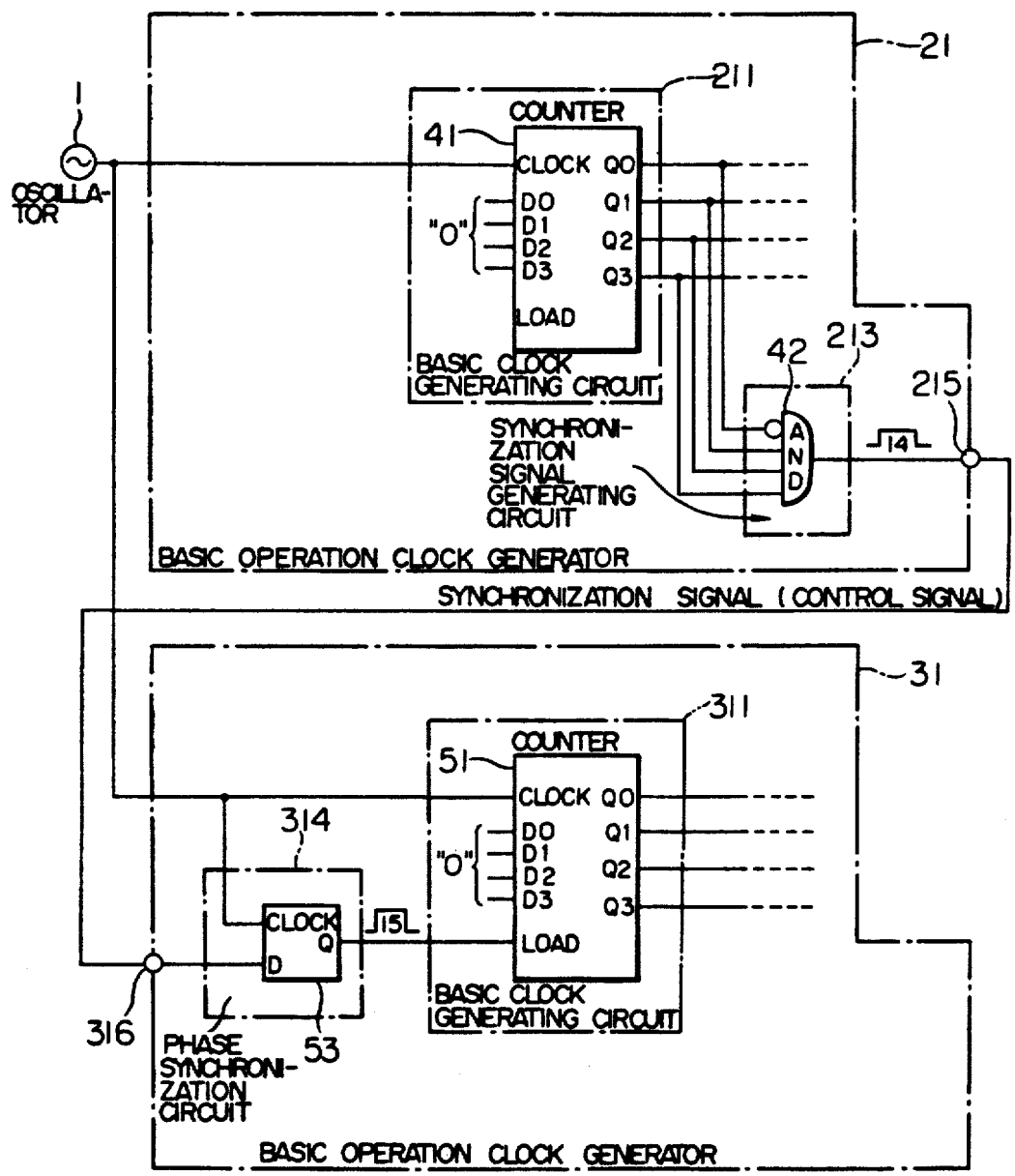
FIG. 2 shows details of a principal part of FIG. 1.
Figure 3:
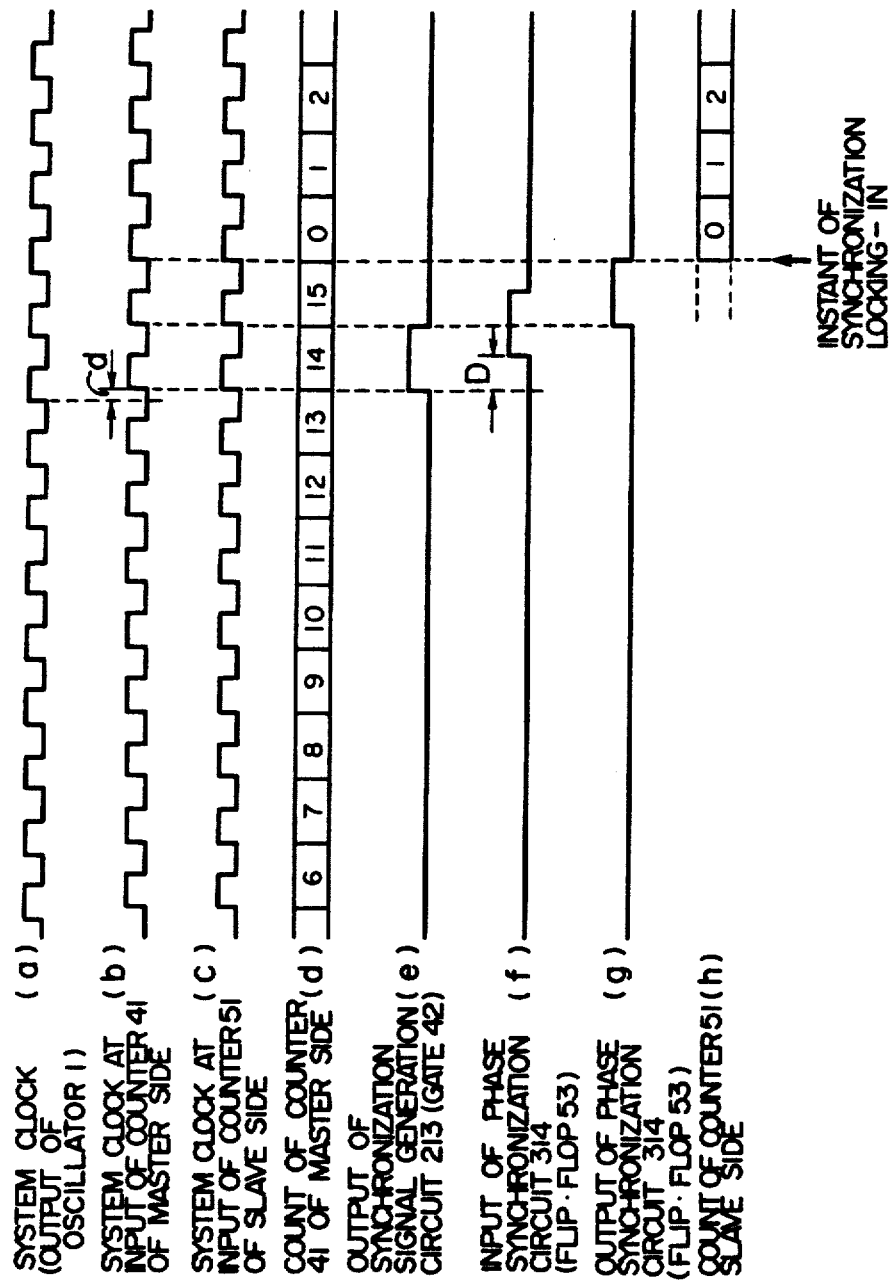
FIG. 3 is a time chart for illustrating the operation of FIG. 2.
Figure 4:
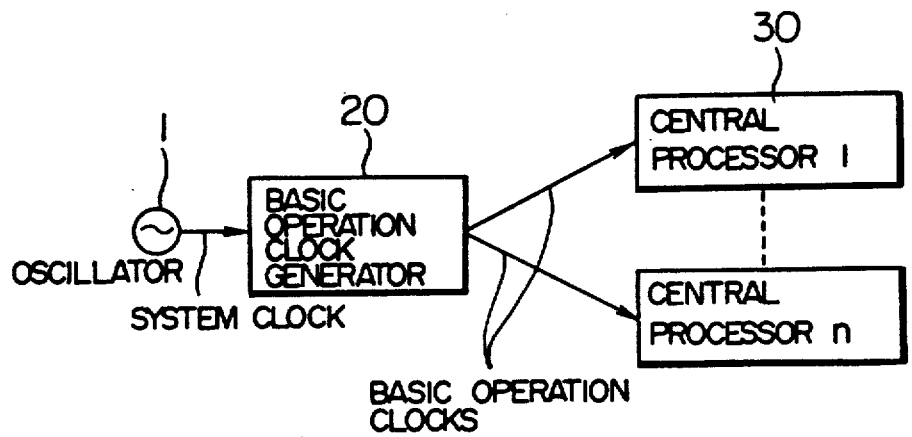
FIGS. 4 and 5 show examples of configuration of conventional clock supply circuits.
Figure 5:
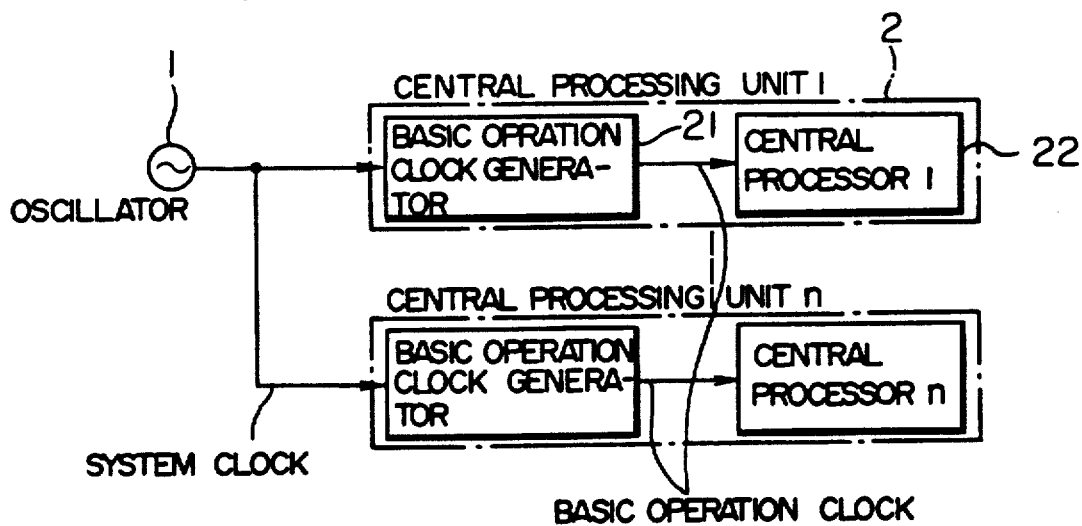

In FIG. 2, the basic clock generating circuit 311 is shown as being constituted by a 4-bit counter 51, and phases and pulse widths of the signals respectively applied to a clock terminal and a load (reset) terminal are set so as to match the operation specification of the counter 51. Owing to this phase synchronization circuit 314, the non-uniformity in delay of the synchronization signal supplied thereto is compensated for and the initialization of the basic clock generating circuit 311 which is operated at a high frequency is made easier. The state establishment of the basic clock generating circuit 311 at the slave side is made to have a value which corrects the delay time.

In FIG. 1, the basic operation clock generation circuits 212 and 312 are formed as blocks separated from the synchronization signal generation circuits 213 and 313, respectively. However, it is evident that both blocks may be integrated into one body without posing any problem. It is also evident that a configuration in which the basic operation clock signal is used as the synchronization signal may be adopted without causing any problem. The same relation is true of the phase synchronization circuits 214 and 314 and the basic clock generation circuits 211 and 311, and is also true of the basic clock generation circuits 211 and 311 and the basic operation clock generation circuits 212 and 312. In the configuration shown in FIG. 1, the inputs of the synchronization signal generation circuits 213 and 313 are taken from the inputs of the basic operation clock generation circuits 212 and 312. However, it is evident that no problem is caused even if those inputs are taken from the outputs of the basic operation clock generation circuits 212 and 312, for example.

Operation of an embodiment of the present invention will now be described in further detail by referring to FIGS. 2 and 3. In FIG. 2, the basic clock generation circuits 211 and 311 of the master and slave sides shown in FIG. 1 are constituted by 4-bit counters 41 and 51, respectively. And, the synchronization signal generation circuit 213 of the master side is constituted by an AND gate 42. The phase synchronization circuit 314 of the slave side is constituted by a flip-flop 53 of edge trigger type. The 4-bit counters 41 and 51 are cyclic counters. Only parts directly relating to the description of the operation are shown in FIG. 2. The phase synchronization circuit 214 of the master side, the synchronization signal generation circuit 313 of the slave side, and the basic operation clock generation circuits 212 and 312 respectively of the master and slave sides as shown in FIG. 1 are omitted. FIG. 3 is a time chart for illustrating the operation at various parts of FIG. 2 when phase synchronization is attained.

The oscillator 1 sends out the system clock (FIG. 3(a)).

The 4-bit counter 41 constituting the basic clock generation circuit 211 of the master side counts system clock pulses (FIG. 3(b)) supplied from the oscillator 1 as shown in FIG. 3(d). During the propagation between the oscillator and the basic clock generation circuit, the system clock signal is delayed by a delay time d due to wiring delay. The AND gate 42 is so configured as to produce a pulse (synchronization signal) as shown in FIG. 3(e) when the counter 41 has reached a count value "14". A circle located at the input of the AND gate 42 represents the negative logic operation. The synchronization signal produced in response to the count "14" of the counter 41 is sent to the phase synchronization circuit 314 of the slave side as the control signal as shown in FIG. 3(f). During the propagation from the AND gate 42 to the phase synchronization circuit 53 of the slave side, the synchronization signal is delayed by a delay time D because of the device delay and the wiring delay. When the delay time D does not exceed one system clock period, the AND gate 42 is so configured as to produce a pulse when the count has reached 14. When the delay time D is equivalent to two system clock periods, the AND gate 42 is so designed as to produce a pulse when the count has reached 13.

The synchronization signal thus transmitted with such a delay time is held and sent out when the counter 41 has counted "15", i.e., with a delay of one master clock. The signal thus produced in response to the count "15" of the counter 41 as shown in FIG. 3(g) is supplied to the load terminal of the 4-bit counter 51 constituting the basic clock generation circuit 311 as the state establishing signal for the basic clock generation circuit 311 of the slave side. This state establishing signal is delayed by the device delays and wiring delays, for example. As a result, the 4-bit counter 51 constituting the basic clock generation circuit 311 of the slave side is initialized to a value "0" set at data inputs D0 to D3 of the counter 51 when the counter 41 has reached the count "0". The arrow of FIG. 3 indicates the instant when the counter 51 is initialized to "0".

When the count of the counter 41 of the master side is "0", the counter 51 of the slave side is also loaded with "0". Whatever value the counter of the counter 51 of the slave side may assume before the arrow of FIG. 3(h), the master side is synchronized with the slave side at the instant represented by the arrow. Since the above described synchronization operation is carried out as soon as the synchronization signal is produced at the master side, rapidity of the synchronization locking-in is also assured.

The system of FIG. 1 includes two central processing units 2 and 3. When three central processing units are used, the basic operation clock generator 31 of the central processing unit 3 is chosen to be the master side, and the synchronization signal produced by its synchronization generation circuit 313 is supplied to the phase synchronization circuit of the basic operation clock generator included in the central processing unit of a succeeding stage through the terminal 315. Or the central processing unit 2 is chosen to be the master of the whole system, and the synchronization signal produced by the synchronization signal generation circuit 213 is supplied through the terminal 215 to the phase synchronization circuits of the basic operation clock generators included in central processing units of succeeding stages or from the third unit on in the same way as to the central processing unit 3. It is a matter of course that these two methods may be combined. Any of these methods is applicable to a system including an arbitrary number of units in the same way. It is also easily understood that the number of the synchronization signal generating circuits and the phase synchronization circuits need not necessarily coincide with the number of units supplied with basic operation clock signals. That is to say, the phase synchronization circuit of the first stage unit and the synchronization signal generation circuit of the final stage unit ar not indispensable when the former method is used. The phase synchronization circuit of the former stage or the master side and the synchronization signal generation circuit of the latter stage or the slave side are not indispensable when the latter method is used.

In the above described embodiment, the system clock issued from the oscillator 1 is supplied to the basic clock generation circuit 211 of the master side and the basic clock generation circuit 311 of the slave side after the same delays d. This is because the line length between the oscillator 1 and the basic clock generation circuit 211 is made equal to the line length between the oscillator 1 and the basic clock generation circuit 311.

As described above, the present invention makes it possible to synchronize independently produced basic operation clock signals of a plurality of units rapidly and using the circuit configuration which is independent of the number of units. Accordingly, expansion of units can be carried out with low cost and with ease.

We claim:

1. In a system including a plurality of processing units, each of said processing units having clock signal generation means for producing a basic operation clock signal on the basis of pulses of a common input clock signal and means activated by said basic operation clock signal for performing an operation, a phase synchronization system, comprising:

means for connecting respective clock signal generation means in cascade, including first means in a preceding processing unit for producing a synchronization signal each time said basic operation clock signal therein reaches a predetermined state and for supplying said synchronization signal to a succeeding processing unit, and second means in the succeeding processing unit for controlling the clock signal generation means therein to set a succeeding counter, which outputs said basic operation clock signal, to an initial state in response to synchronization, by said second means, of said synchronization signal supplied from the first means of the preceding processing unit with said common input clock signal, whereby phases of basic operation clock signals of said preceding and succeeding processing units are matched to each other at the time said initial state is set in said succeeding processing unit.

2. A phase synchronization system according to claim 1, wherein said clock signal generation means of said preceding processing unit includes a preceding counter connected to count said pulses of said common input clock signal and to produce said basic operation clock signal as count values, said first means being connected to said preceding counter to receive said count values of said basic operation clock signal from said preceding counter and to produce said synchronization signal when a count value of said count values of said basic operation clock signal indicated by said preceding counter has reached a predetermined value.

3. A phase synchronization system according to claim 2, wherein said clock signal generation means of said succeeding processing unit includes said succeeding counter connected to count said pulses of said common input clock signal and to produce said basic operation clock signal as count values, said succeeding counter being connected to said second means to be set to its initial state by said second means in response to synchronizing, by said second means of said synchronization signal from said first means with said common input clock signal.

4. A phase synchronization system for supplying operation clock signals having an identical phase to a plurality of processors, comprising:

an oscillator for producing a system clock signal;

a plurality of cyclic counters each respectively associated with a respective one of said plurality of processors, each of said cyclic counters being connected to count pulses of said system clock signal and to supply an operation clock signal as count values for operation of said respective one of said plurality of processors;

detection means connected to at least one of said plurality of cyclic counters for producing a synchronization signal in response to detection of a predetermined count of said one cyclic counter; and setting means connected to at least one other cyclic counter of said plurality of cyclic counters and responsive to said detection means for setting an initial count value in said other cyclic counter in response to synchronizing, by said setting means, of said synchronization signal with said system clock signal, so that phases of said operation clock signals represented by said count values and produced by said one and said other cyclic counters are matched when said other cyclic counter is set to the initial count value.

5. A phase synchronization system according to claim 4, wherein said one cyclic counter and said detection means connected to said one cyclic counter are included with said respective one of said plurality of processors in one integrated circuit.

6. A phase synchronization system according to claim 5, wherein said setting means is responsive to said synchronization signal from said detection means to establish an initial count value in the count of said other cyclic counter in synchronism with said system clock signal.

7. A phase synchronization system according to claim 4, wherein a count value to be predetermined for said detection means is defined on the basis of the delay time required for the synchronization signal to be propagated from said detection means to said setting means.

8. A phase synchronization system according to claim 4, wherein said detection means supplies a synchronization signal in common to said setting means connected to said other cyclic counter.

9. A phase synchronization system according to claim 4, further comprising means for transmitting the system clock signal from said oscillator so as to apply said system clock signal to said plurality of cyclic counters after identical delays.

* * * * *